United States Patent
Maronati et al.

(10) Patent No.: US 11,268,584 B2
(45) Date of Patent: Mar. 8, 2022

(54) BRAKE DISC FOR A DISC BRAKE AND METHOD

(71) Applicant: FRENI BREMBO S.p.A., Curno (IT)

(72) Inventors: Gianluigi Maronati, Curno (IT); Fabiano Carminati, Curno (IT)

(73) Assignee: Freni Brembo S.p.A., Bergamo (IT)

( * ) Notice: Subject to any disclaimer, the term of this patent is extended or adjusted under 35 U.S.C. 154(b) by 59 days.

(21) Appl. No.: 16/958,782

(22) PCT Filed: Dec. 21, 2018

(86) PCT No.: PCT/IB2018/060488
§ 371 (c)(1),
(2) Date: Jun. 29, 2020

(87) PCT Pub. No.: WO2019/130188
PCT Pub. Date: Jul. 4, 2019

(65) Prior Publication Data
US 2020/0325946 A1 Oct. 15, 2020

(30) Foreign Application Priority Data
Dec. 29, 2017 (IT) .................. 102017000150802

(51) Int. Cl.
*F16D 65/12* (2006.01)
*F16D 65/00* (2006.01)
*F16D 65/02* (2006.01)

(52) U.S. Cl.
CPC ....... *F16D 65/123* (2013.01); *F16D 65/0006* (2013.01); *F16D 65/128* (2013.01);
(Continued)

(58) Field of Classification Search
CPC .................. F16D 65/12; F16D 65/123–128
(Continued)

(56) References Cited

U.S. PATENT DOCUMENTS

| 7,770,699 | B2 | 8/2010 | Schlitz et al. |
| 9,657,794 | B2 * | 5/2017 | Morio ............ F16D 65/123 |

(Continued)

FOREIGN PATENT DOCUMENTS

| DE | 19726674 A1 * | 1/1998 | .......... F16D 65/123 |
| DE | 10159799 A1 | 6/2003 | |

(Continued)

OTHER PUBLICATIONS

European Patent Office, International Search Report with Written Opinion, issued in PCT/IB2018/060488, dated Mar. 12, 2019, 11 pages, European Patent Office, Rijswijk, Netherlands.

*Primary Examiner* — Christopher P Schwartz
(74) *Attorney, Agent, or Firm* — Marshall & Melhorn, LLC

(57) ABSTRACT

A disc has a braking band, a bell and elastic elements. The braking band has a plurality of radial teeth projecting from a radially internal edge portion, delimiting a plurality of band seats. Each radial tooth has a radially internal edge surface, a first and a second axial tooth side, and at least one circumferential side. A plurality of axial teeth project delimiting a plurality of bell seats. The plurality of radial teeth is housed in the plurality of bell seats. The internal bell surface is aligned with the radially internal edge surface of each radial tooth. Each elastic element is removably connected to the axial teeth and embraces a portion of first and second axial tooth sides and of circumferential side of the radial teeth of the braking band, elastically preloading the radial teeth with respect to the bell.

20 Claims, 7 Drawing Sheets

(52) U.S. Cl.
CPC ............. *F16D 2065/132* (2013.01); *F16D 2065/1316* (2013.01); *F16D 2065/1328* (2013.01); *F16D 2065/1356* (2013.01); *F16D 2065/1396* (2013.01); *F16D 2250/0084* (2013.01)

(58) Field of Classification Search
USPC .......................................... 188/18 A, 218 XL
See application file for complete search history.

(56) References Cited

U.S. PATENT DOCUMENTS

| | | | |
|---|---|---|---|
| 10,066,690 B2 | 9/2018 | Pahle et al. | |
| 2003/0066715 A1* | 4/2003 | Baumgartner | F16D 65/128 188/18 A |
| 2004/0178030 A1* | 9/2004 | Pacchiana | F16D 65/128 188/218 XL |
| 2010/0307875 A1* | 12/2010 | Ilg | F16D 65/123 188/218 XL |
| 2017/0030423 A1* | 2/2017 | Comenduli | F16D 65/128 |

FOREIGN PATENT DOCUMENTS

| | | |
|---|---|---|
| EP | 2604883 A2 | 6/2013 |
| WO | WO 02/33280 A1 | 4/2002 |
| WO | WO 2008/026990 A1 | 3/2008 |

* cited by examiner

FIG.4bis

BRAKE DISC FOR A DISC BRAKE AND METHOD

FIELD OF THE INVENTION

The present invention relates to a disc for a disc brake.

In particular, the present invention relates to a disc comprising a braking band and a bell assembled to each other.

Furthermore, the present invention relates to a method for assembling a disc for disc brake.

BACKGROUND ART

In a disc brake, the brake caliper is generally arranged straddling the external peripheral margin of the disc. The disc is suitable to rotate about a rotation axis (A-A) defining an axial direction (A-A). In a disc brake, a radial direction (R-R), arranged substantially orthogonal to said axial direction (A-A), and a tangential or circumferential direction (C-C), orthogonal to both said axial direction (A-A) and said radial direction (R-R), are further defined.

In a typical arrangement of a disc for disc brake on a vehicle, a braking surface of the brake disc faces the outside of the vehicle or towards the vehicle wheel, thus defining the vehicle facing side of the disc, and the opposite braking surface of the brake disc faces the vehicle itself, thus defining the vehicle facing side of the disc.

Nowadays, many embodiments of discs for disc brake provide for making at least two parts separately: a braking band, on which the gripper acts to generate the braking torque, and a bell fixed to the wheel hub and associated with the braking band. The connection system between braking band and bell is very important because it ensures the transfer of braking torque from band to bell.

Usually, the constraint in circumferential (C-C) or tangential (C-C) direction between braking band and bell can be achieved by means of radial protuberances which extend from the braking band towards the rotation axis of the disc and couple in respective seats of the bell in order to achieve a tangential constraint system between band and bell having a particularly simple structure and therefore low production costs.

Document WO-02-33280 in the name of the same Applicant shows a solution of the disc for a disc brake in which the connecting system between braking band and the disc bell is formed by the coupling between the radially directed teeth of the braking band and axially directed teeth of the bell. An elastic blade is fixed on the face directed towards the rotation axis of the disc of the radially internal end of each tooth of the braking band. Said plate comprises opposite arms which embrace the tooth of the braking band to which the blade is fixed interposed in circumferential direction (C-C) between the tooth of the braking band and two consecutive axial teeth of the bell to apply a preload direct in circumferential direction (C-C) suitable to prevent the occurrence of circumferential impacts between braking band and bell at the beginning and at the end of the braking action.

A predetermined, albeit minimal, clearance is guaranteed in axial direction (A-A) by virtue of the joint provision of an axial retaining ring which is screwed onto the face directed towards the vehicle of the teeth of the bell and an opposite axial abutment for the braking band made on the body of the bell itself. In this manner, during the braking action, when the brake caliper clamps the braking band between the pads, said braking band slides axially on the bell so as to orient itself coplanar to said pads.

Solutions of this type, although advantageous from some points of view, still generate axial impacts between braking band and the axial abutment achieved on the bell body.

Particularly for applications on commercial vehicles and industrial vehicles, document WO-2008-026990 shows a solution of brake disc for dual wheels. In this disclosure, the connection system between the axial teeth of the bell and the radial teeth of the braking band comprises fixing elements which sandwich the band against the bell by virtue of an elastic blade which, with its front portions, also performs the function of axial restraint towards the side of the brake disc facing the vehicle.

Although advantageous from some points of view, this solution does not fully solve the problem of the occurrence of undesired rattling due to the impacts of the braking band against the disc bell.

The need is therefore strongly felt to minimize the occurrence of rattling noises due to impacts between braking band and the disc bell in circumferential direction and in axial direction.

At the same time, the need is strongly felt to provide a brake disc solution which is compact in axial direction and concurrently capable of delimiting a large volume of space within the dimensions of the disc bell in which to accommodate bearings or other connecting devices to the wheel hub and the like.

SOLUTION

It is an object of the present invention to solve the drawbacks of the prior art mentioned above and to provide a solution to the needs described hereto with reference to the prior art.

It is an object of the present invention to provide a solution of disc for disc brake of quieter operation, as well as limited axial dimensions, albeit suitable to provide a large volume of space in the zone surrounding the rotation axis of the disc.

These and other objects are achieved by the disc and the method described in detail below.

Some advantageous embodiments are the subject of the dependent claims.

Thanks to the suggested solutions, it is possible to eliminate or at least minimize the clearances between braking band and bell in axial direction and in circumferential direction, substantially eliminating the occurrence of impacts between the braking band and the bell in operating conditions.

At the same time, by virtue of the suggested solutions, it is possible to reduce the dimensions of the disc in the axial direction without reducing the mechanical strength properties of the disc itself and in all cases ensuring a large volume of space enclosed at least partially by the body of the disc bell.

FIGURES

Further features and advantages of the disc and of the method will be apparent from the following description of its preferred embodiments, by way of non-limiting examples, with reference to the accompanying figures, in which:

FIG. 4bis shows an enlarged detail of the braking band and of the elastic elements shown in FIG. 4;

DESCRIPTION OF SOME PREFERRED EMBODIMENTS

Figure 1:
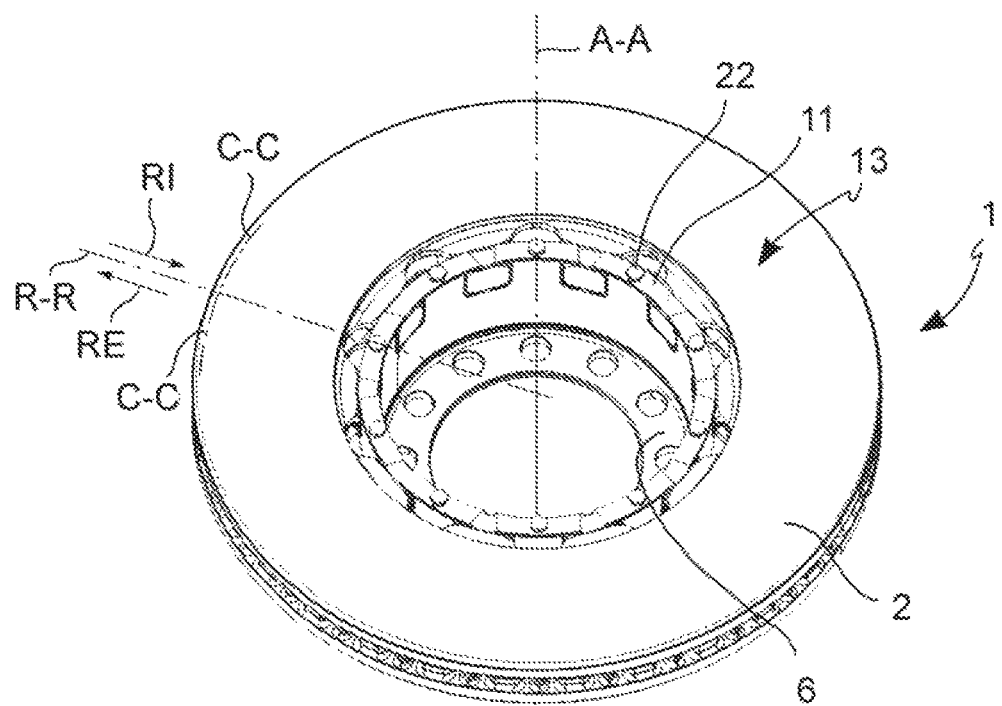
FIG. 1 is an axonometric view of a disc, according to an embodiment.
Figure 2:
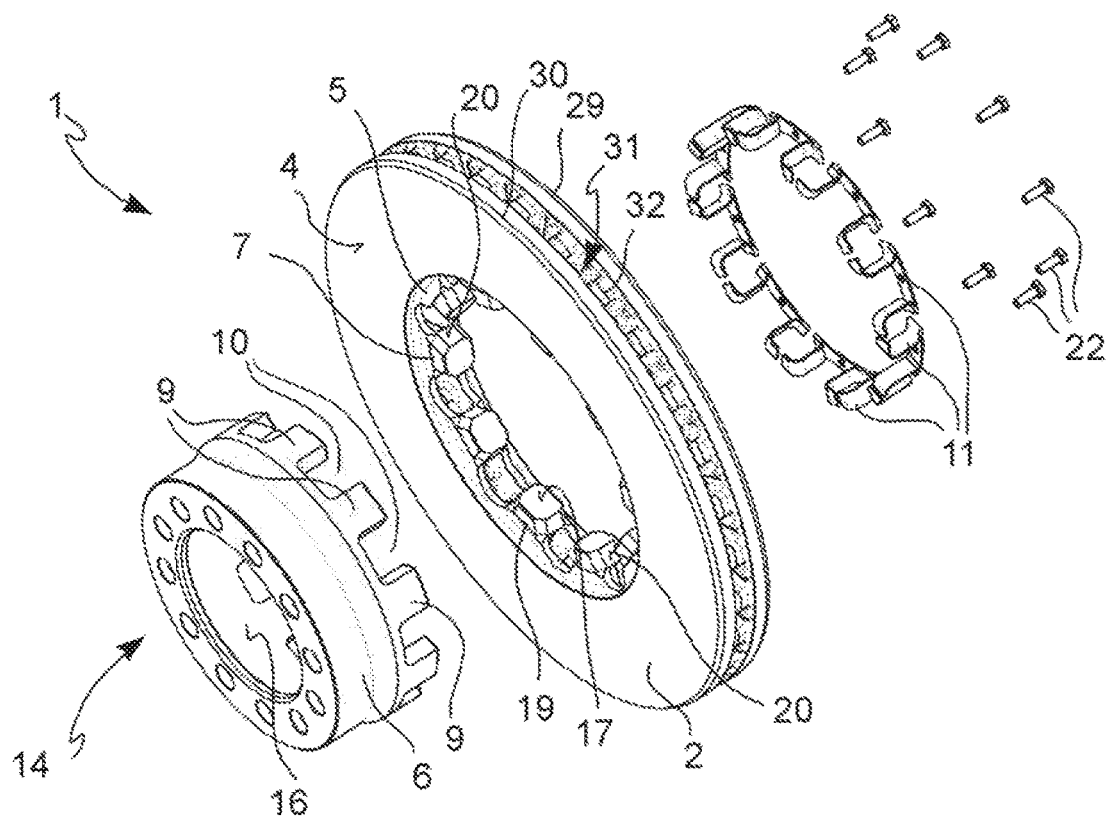
FIGS. 2 and 3 are axonometric views with separated parts of a disc, according to an embodiment.
Figure 3:
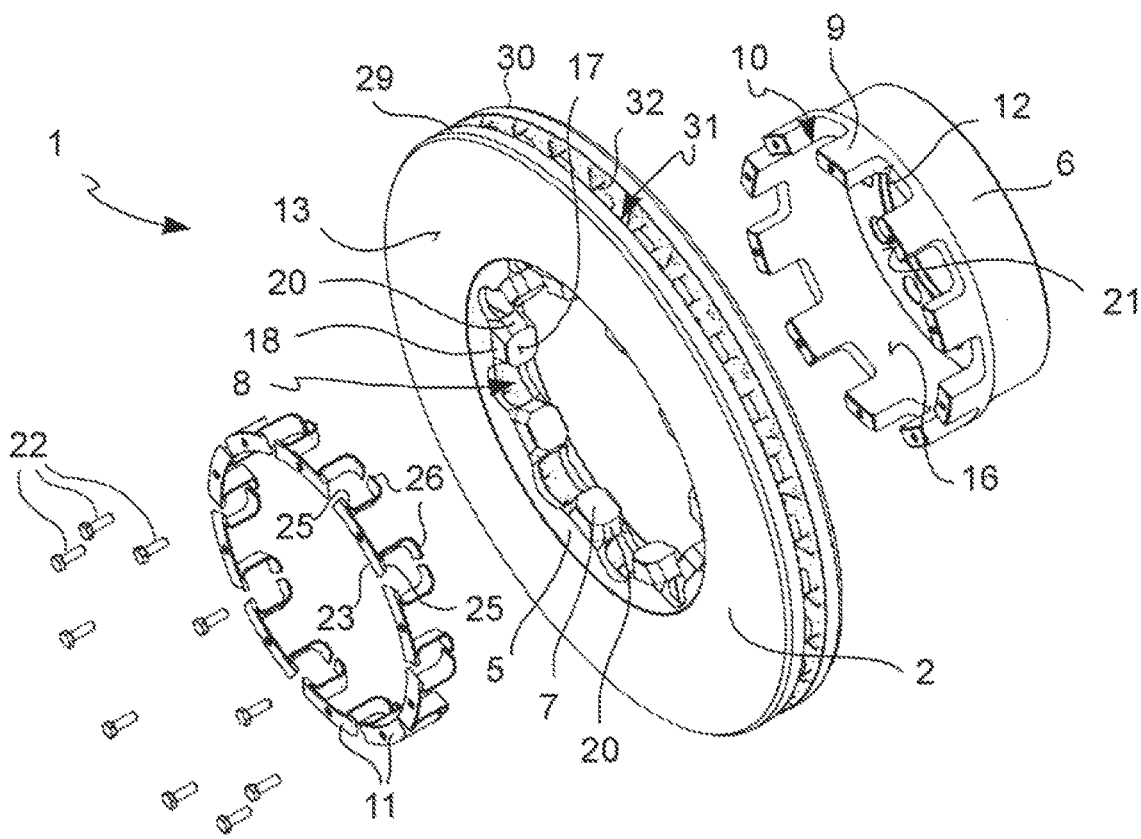
Figure 4:
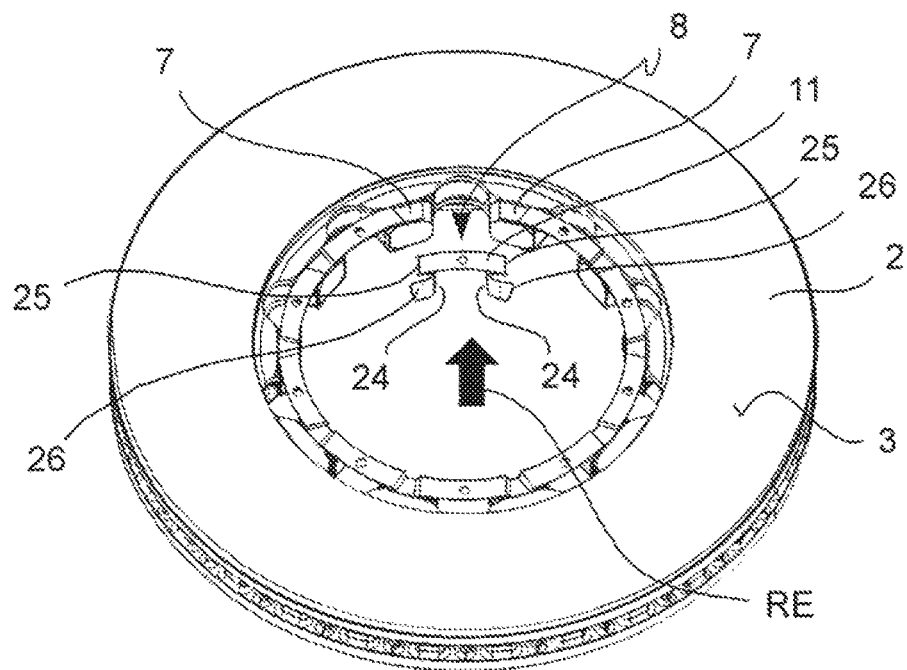
FIG. 4 is an axonometric view of a braking band and a plurality of elastic elements, according to an embodiment, as well as a possible step of an assembling method according to an operating method.
Figure 5:
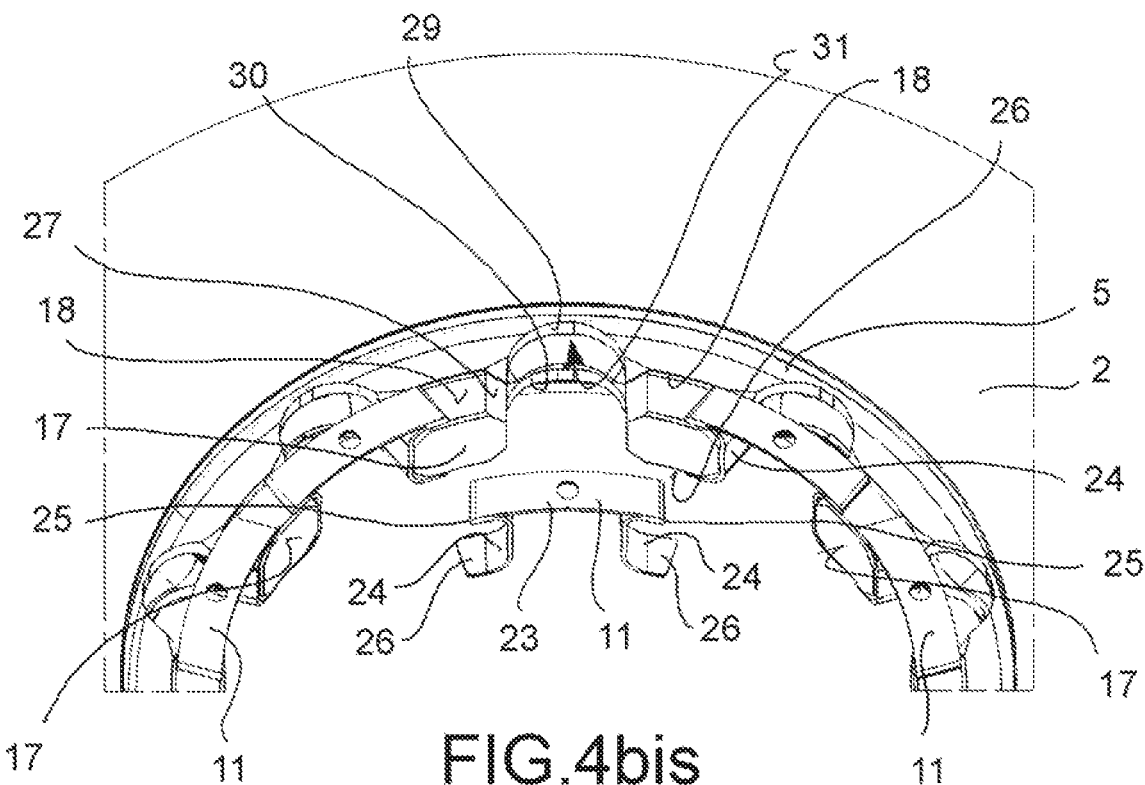
FIG. 5 shows an axonometric view of a braking band and of a plurality of elastic elements, according to an embodiment, as well as a possible step of an assembling method according to an operating method.
Figure 5:
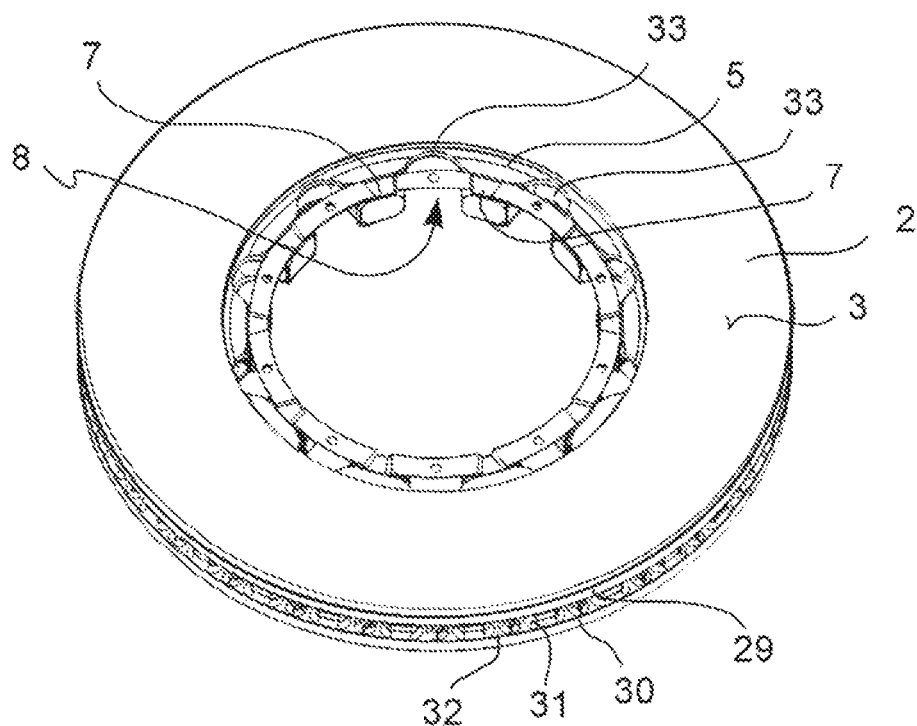
Figure 7:
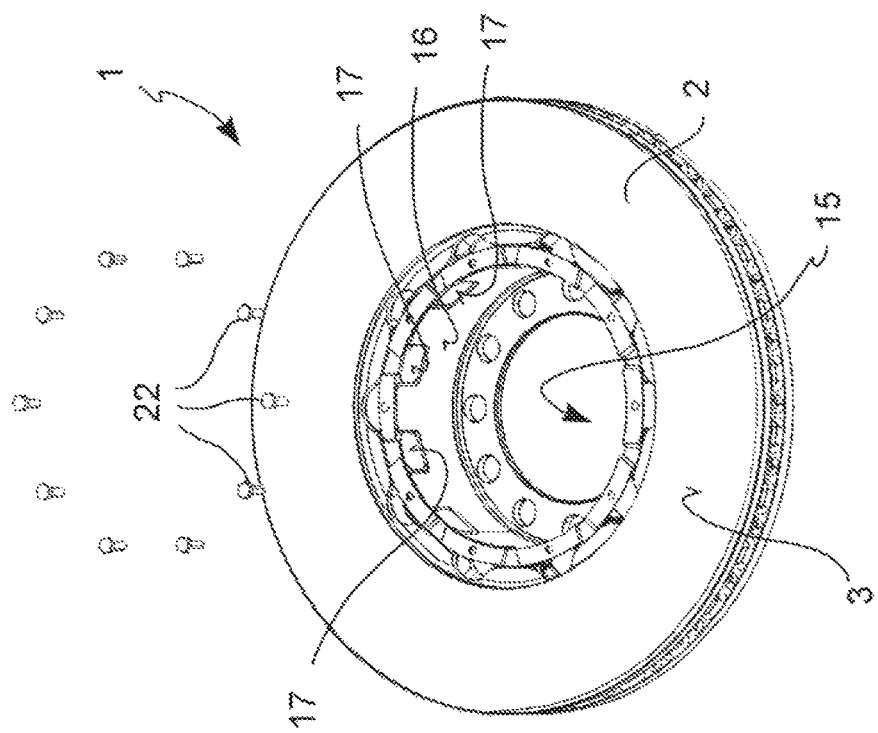
FIG. 7 is an axonometric view of a disc, according to an embodiment, in which the fixing devices of the elastic elements are shown as separate devices.
Figure 6:
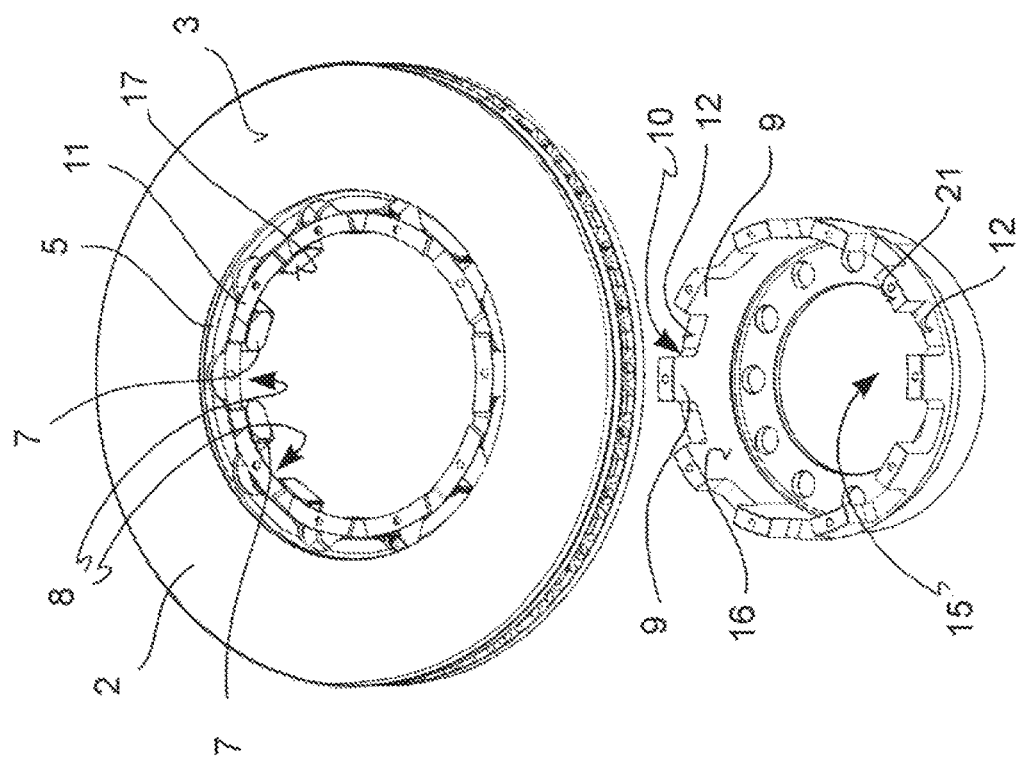
FIG. 6 is an axonometric view with separated parts of a disc, according to an embodiment, as well as a possible step of an assembling method according to an operating method.
Figure 8:
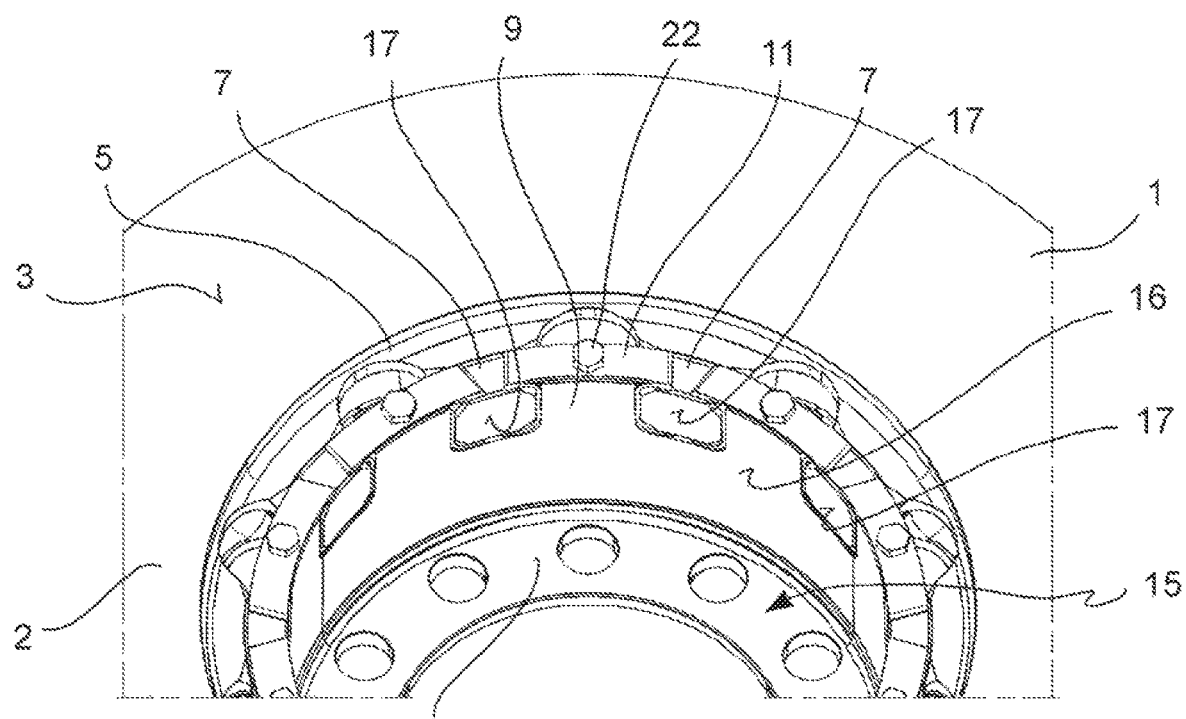
FIG. 8 is an axonometric view of a disc, according to a further embodiment.
Figure 9:
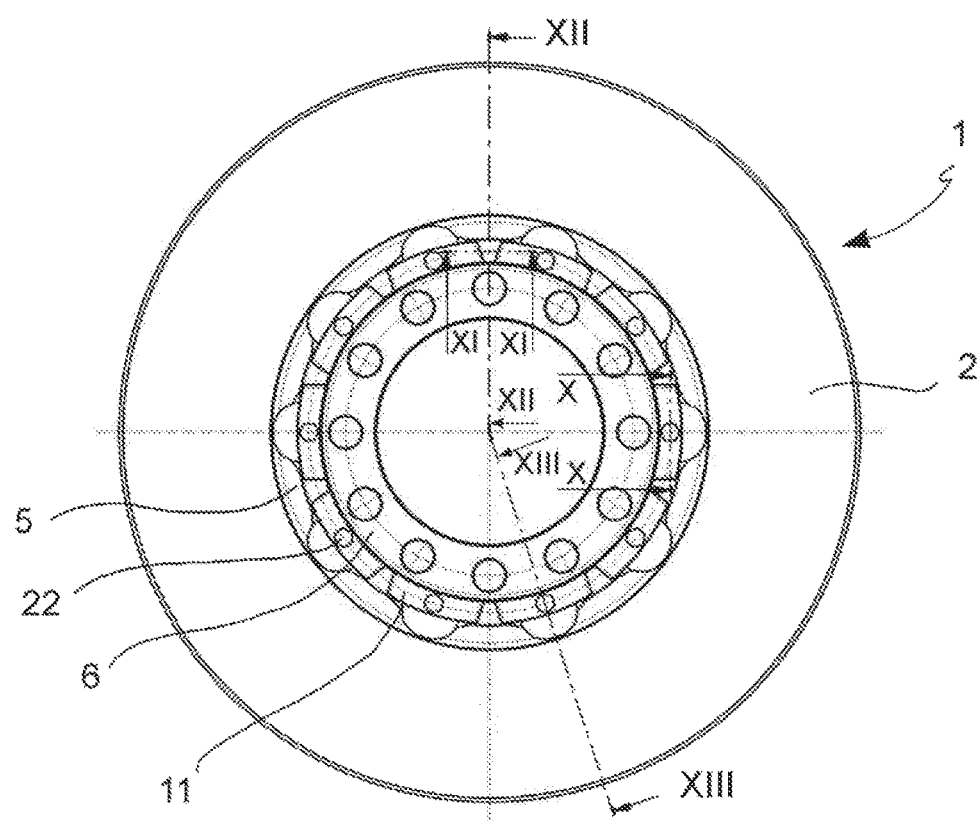
FIG. 9 is a vertical elevation view of a disc, according to an embodiment.
Figure 10:
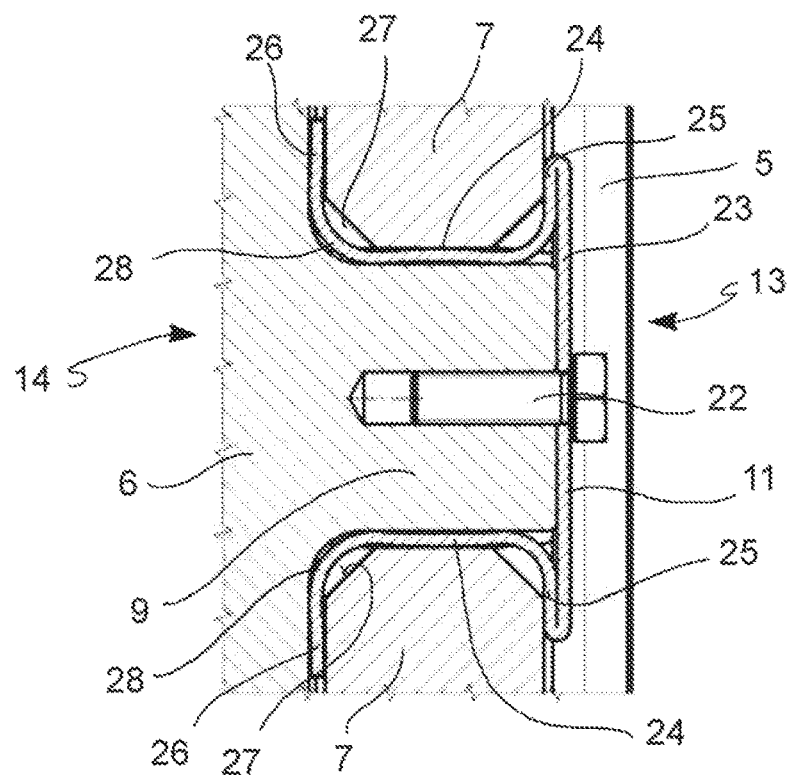
FIG. 10 is a circumferential and axial section view taken along the plotting plane indicated by the arrows X-X in FIG. 9.
Figure 11:
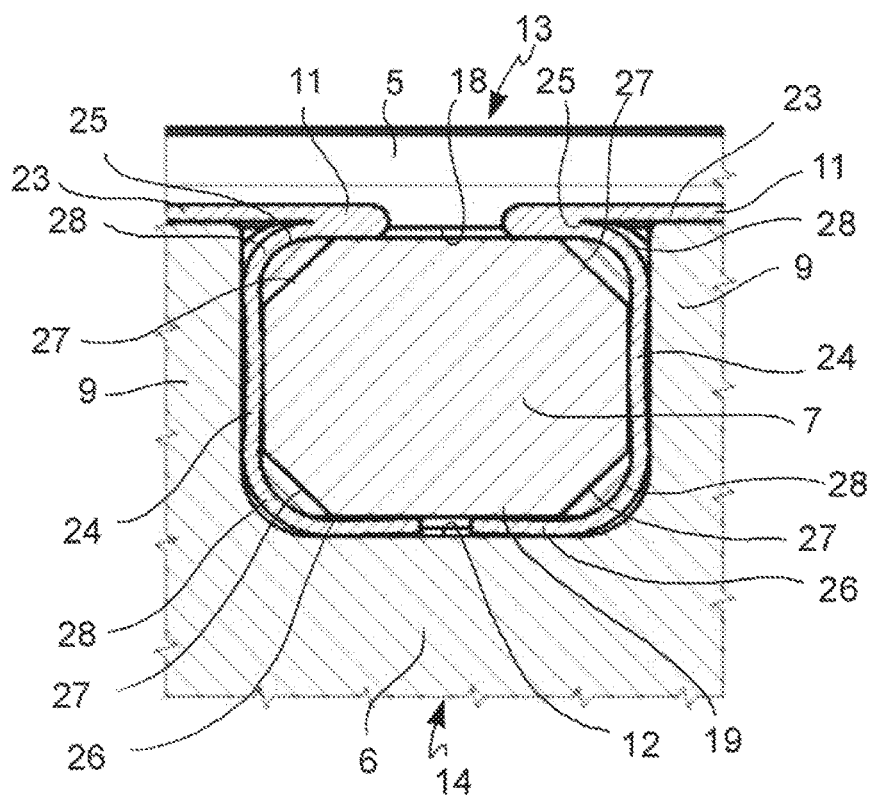
FIG. 11 is a circumferential and axial section view taken along the plotting plane indicated by the arrows XI-XI in FIG. 9.
Figure 12:
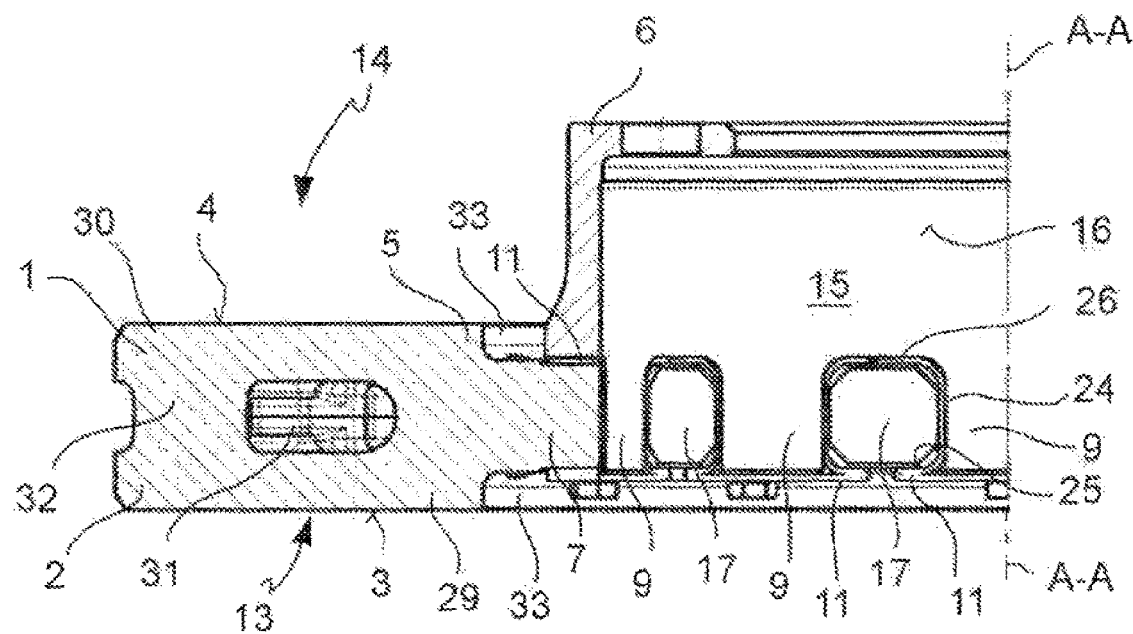
FIGS. 12 and 13 are axial and radial section views of a portion of a disc taken along the plotting planes indicated by the arrows XII-XII and XIII-XIII in FIG. 9, respectively.
Figure 13:
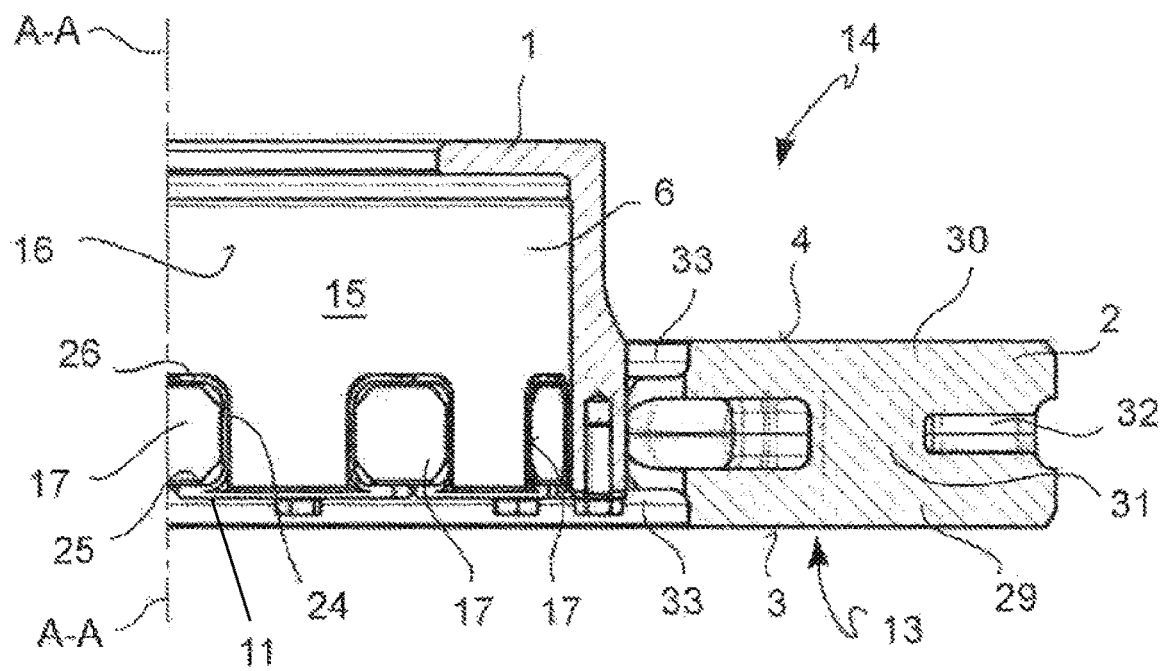

According to a general embodiment, a disc 1 for disc brake is provided, suitable to rotate about a rotation axis A-A which defines an axial direction A-A either coincident with or parallel to the rotation axis of the disc. Said disc 1 further defines a radial direction R-R, which is orthogonal to the axial direction A-A, and a circumferential direction C-C, which is orthogonal to both said axial direction A-A and said radial direction R-R. Preferably, said radial direction R-R further defines a radially internal sense RI facing the rotation axis A-A of the disc 1 and an opposite radially external sense RE, opposite to said radially internal sense RI.

Said disc 1 comprises a braking band 2, a disc bell 6 or bell 6, suitable to form a connection with the wheel hub of a vehicle which can be associated with the disc 1, and a plurality of elastic elements 11, suitable to elastically bias the braking band 2 with respect to said bell 6.

Said braking band 2 comprise a first braking surface 3 and a second braking surface 4, opposite to said first braking surface 3.

Said first braking surface defines an axially internal side 13 or vehicle facing side 13 of the disc 1.

Said second braking surface 4 defines an axially external side 14 or wheel facing side 14 of the disc 1, opposite to said vehicle facing side 13.

Said braking band 2 comprises at least one radially internal edge portion 5, suitable to face the rotation axis A-A of the disc 1.

Said bell 6 has a body which delimits a central bell seat 15 of substantially cylindrical shape. Preferably, said bell 6 has a substantially axisymmetric body which develops about said rotation axis A-A of the disc 1. Preferably, said bell central seat 15 forms a substantially axisymmetric cavity which develops about said rotation axis A-A of the disc 1.

Said bell 6 comprises an internal bell surface 16 of substantially cylindrical shape and facing said central bell seat 15.

Said braking band 2 comprises a plurality of radial teeth 7 which project from said radially internal edge portion 5 of the braking band 2 towards the rotation axis A-A of the disc 1, thus delimiting a plurality of band seats 8. Preferably, said plurality of radial teeth 7 of the braking band 2 extend substantially in radial direction R-R from the radially internal edge portion 5 towards the rotation axis of the disc A-A. According to a preferred embodiment, said plurality of band seats 8 defined by said plurality of radial teeth 7 are accessible or at least open in axial direction A-A, preferably can be accessed or open in axial direction A-A at least from said wheel facing side 14 of the disc 1.

According to an embodiment, said plurality of band seats 8 defined by said plurality of radial teeth 7 are accessible or open in axial direction A-A and in radial direction R-R.

Each radial tooth 7 of said plurality of radial teeth 7 of the braking band 2 comprises a radially internal edge surface 17 facing the rotation axis A-A of the disc 1.

Each radial tooth 7 of said plurality of radial teeth 7 of the braking band 2 comprises a first axial tooth side 18 facing said vehicle facing side 13 of the disc 1 and a second opposite axial tooth side 19, opposite with respect to said first axial tooth side 18 and facing said wheel facing side 14 of the disc 1.

Each radial tooth 7 of said plurality of radial teeth 7 of the braking band 2 comprises at least one circumferential side facing in circumferential direction C-C. Preferably, said at least one circumferential side 20 facing in the circumferential direction C-C at least partly defines a band seat 8 in circumferential direction C-C.

According to an embodiment, each radial tooth 7 of the braking band 2 has dimensions delimited axially by said first axial tooth side 18 and said second axial tooth side 19 and defined circumferentially by a pair of opposite circumferential sides 20, opposite with respect to said radial tooth 7 in circumferential direction C-C.

According to a preferred embodiment, each circumferential side 20 of the radial tooth 7 is connected to said first axial tooth side 18 and to said second axial tooth side 19 forming a beveled or cut corner 27.

Said bell 6 comprises a plurality of axial teeth 9 which project from the body of said bell 6 towards said vehicle facing side 13 of the disc 1 at least partially delimiting a plurality of bell seats 10. According to a preferred embodiment, said plurality of bell seats 10 either can be accessed or are open at least in axial direction A-A on said vehicle facing side 13 of the disc 1. According to an embodiment, said plurality of bell seats 10 either can be accessed or is open at least in axial direction A-A on said vehicle facing side 13 of the disc 1 and in radial direction R-R, preferably at least according to said radially internal sense RI.

Said bell 6 comprises a plurality of axial abutting surfaces 12 which delimit in axial direction A-A said plurality of bell seats 10. Preferably, said plurality of axial abutting surfaces 12 are positioned directed towards said vehicle facing side 13 of the disc 1, thus forming the bottom seat walls which axially close respective bell seats 10 thus making them inaccessible from said wheel facing side 14 of the disc 1.

Said plurality of radial teeth 7 of the braking band 2 are housed in said plurality of bell seats 10, so that said internal bell surface 16 is locally aligned with said radially internal edge surface 17 of each radial tooth 7 of the braking band 2. In this manner, said internal bell surface 16 is locally substantially coplanar with said radially internal edge surface 17 of each radial tooth 7. Preferably, said internal bell surface 16 is substantially flush with the radially internal edge surfaces 17 of said plurality of radial teeth 7 of the braking band 2.

By virtue of such a relative arrangement of the bell internal surface 16 and the radially internal edge surface 17 of each radial tooth 7, it is possible to reduce the overall dimension of the disc 1 at least in axial direction A-A, the structural strength of the disc itself being equal.

Preferably, said second axial tooth side 19 comprises an abutment surface which abuts, either directly or indirectly by means of the interposition of at least one portion of the at least one elastic element 11 of said plurality of elastic elements 11, against said abutting surface 12 of the bell 6.

Preferably, said at least one circumferential side 20 of the radial tooth 7 comprises a feeding surface suitable to directly or indirectly exchange a thrust action with at least one portion of at least one axial tooth 9 of said plurality of axial teeth 9 of the bell 6, in operating conditions by means of the interposition of at least one portion of the at least one elastic element 11 of said plurality of elastic elements 11.

Each elastic element 11 of said plurality of elastic elements 11 is removably connected to at least one axial tooth 9 of said bell. According to a preferred embodiment, each axial tooth 9 of the bell 6 comprises a bell tooth front surface 21 axially facing said vehicle facing side 13 of the disc 1, and each elastic element 11 is connected in removable manner to said bell tooth front surface 21. Preferably, each elastic element 11 is connected in removable manner on said bell tooth front surface 21 by means of a fixing device 22.

Advantageously, each elastic element 11 of said plurality of elastic elements 11 embraces at least one portion of said first axial tooth side 18, of said second axial tooth side 19 and of said at least one circumferential tooth side 20 of at least one radial tooth 7 of the braking band 2, elastically preloading said at least one radial tooth 7 with respect to said bell 6.

By virtue of the provision of such elastic elements 11 it is possible to elastically preload said plurality of radial teeth 7 of the braking band 2 with respect to said plurality of axial teeth 9 of the bell 6 at least in axial direction A-A from both of said vehicle side facing 13 and said wheel facing side 14 of the disc 1.

By virtue of the provision of such elastic elements 11 it is also possible to apply an elastic preload directed in circumferential direction C-C between each radial tooth 7 of the braking band 2 and each axial tooth 9 of the bell 6.

Such a disc 1 allows to minimize the occurrence of annoying rattling noises due to impacts between the braking band and the bell.

By virtue of such a disc 1 it is possible to eliminate or at least minimize the clearances between braking band 2 and bell 6 in axial direction A-A and in circumferential direction C-C.

According to a preferred embodiment, each elastic element 11 is made in one piece.

According to an embodiment, each elastic element 11 comprises a front elastic element portion 23, suitable to be removably connected to said front bell tooth surface 21 by means of a fixing device 22.

According to an embodiment, each elastic element 11 comprises at least one axial arm 24, suitable to embrace at least one portion of said at least one circumferential side 20 of said radial tooth 7 of the braking band 2.

According to an embodiment, said at least one axial arm 24 of the elastic element 11 comprises a free end portion 26 which embraces at least one portion of said second axial tooth side 19 of each radial tooth 7 of the braking band 2.

According to an embodiment, said at least one axial arm 24 of the elastic element 11 comprises a front connecting portion 25 which embraces at least one portion of said first axial tooth side 18 of each radial tooth 7 of the braking band 2, connecting to said front elastic element portion 23.

According to an embodiment, said at least one axial arm 24 comprises a leaf spring which elastically biases away from one another said at least one circumferential tooth side 20 of each radial tooth 7 of the braking band 2 and a facing adjacent axial tooth 9 of the bell 6.

According to an embodiment, said front connecting portion 25 of the elastic element elastically biases, preferably in axial direction A-A, said radial tooth 7 of the braking band 2 towards said axial abutting surface 12 of said bell 6.

According to an embodiment, said free end portion 26 of the at least one axial arm 24 of the elastic element 11 comprises a leaf spring substantially interposed between said second axial side 19 of the radial tooth 7 of the braking band 2 and said axial abutting surface 12 of the bell 6 which biases away from one another said second axial side 19 of the radial tooth 7 of the braking band 2 and said axial abutting surface 12 of the bell 6.

According to an embodiment, each elastic element 11 comprises a couple of opposing axial arms 24, so as to interpose itself between each of the opposite sides of each axial tooth 9 of the bell 6 and two opposite adjacent radial teeth 7 of the braking band 2.

According to an embodiment, each elastic element 11 comprises two opposing axial arms 24 each forming a front connecting portion 25 and a free end portion 26, wherein the front connecting portions 25 axially bias two radial teeth 7 of the braking band 2 adjacent to each axial tooth 9 of the bell 6 and opposite in a circumferential direction C-C with respect to the axial tooth 9, and wherein said free end portions 26 axially bias said two radial teeth 7 of the braking band 2 adjacent to each axial tooth 9 of the bell 6 and opposite in circumferential direction C-C with respect to said axial tooth 9.

According to an embodiment, each circumferential side 20 of the radial tooth 7 is joined to said first axial tooth side 18 and to said second axial tooth side 19 forming beveled edges 27, and wherein each axial arm 24 of each elastic element 11 comprises curved portions 28 which avoid staying in contact with said beveled corners 27. In this manner, repeatability and reliability of the action of the elastic bias applied by the plurality of elastic elements 11 on the braking band 2 and on the bell 6 is improved, thus preventing the elastic elements 11 from working on corner portions 27 which would prematurely deteriorate by fatigue and which at the same time would reduce the working life of the elastic element.

Preferably, "beveled corners" also refers to the provision of radial teeth 7 having cuts or recesses between each circumferential side 20 and each of said first and second axial edges 18,10 of the radial tooth 7 which substantially face a flat surface.

The provision of such elastic elements 11 by avoiding to constrain the braking band to the bell in radial direction in any case allows the relative sliding of braking band and bell in radial direction R-R due to thermal deformation caused by thermal stresses which occur during the braking action.

According to an embodiment, said braking band 2 comprises two plates 29, 30 facing each other in axial direction A-A and spaced apart from each other by a predetermined axial distance thus forming a gap 31, wherein said braking band comprises a plurality of connecting-spacing elements 32 which extend to connect said two facing plates 29, 30 to each other, thus delimiting ventilation channels suitable to convey a flow of cooling fluid.

According to an embodiment, said radially internal edge portion 5 of the braking band delimits mouths 33, open in an axial direction A-A, for accessing the ventilation channels inside said gap 31, so as to allow cooling fluid to access the ventilation channels. Preferably, at least some of said mouths 33 for accessing the ventilation channels are open towards said vehicle facing side 13 of the disc 1. Preferably, at least some of said mouths 33 for accessing the ventilation channels are open towards said wheel facing side 14 of the disc 1.

A method of assembling a disc for disc brake 1 is described below.

According to a general embodiment, a method of assembling a disc 1 for a disc brake comprises the following steps:
    providing a braking band having a plurality of radial teeth 7 which project from a radially internal edge portion 5 of the braking band 2 towards the rotation axis A-A of the disc 1, delimiting a plurality of band seats 8;
    providing a plurality of elastic elements 11;
    inserting, preferably in radial direction R-R and even more preferably in radially external sense RE, each elastic element 11 of said plurality of elastic elements 11 into a band seat 8 of the braking band 2;
    associating with said braking band a bell 6 comprising a plurality of axial teeth 9 which project from the body of said bell 6 towards said vehicle facing side 13 of the disc 1 at least partially delimiting a plurality of bell seats 10, so that the internal surface of the bell is locally aligned with the radially internal edge surface 17 of each radial tooth 7 of the braking band 2;
    connecting each elastic element 11 to an axial tooth 9 of the bell 6, preferably by using a fixing device 22;
    elastically preloading said plurality of radial teeth of the braking band 2 with respect to said bell 6 in axial direction A-A and in circumferential direction C-C.

According to a possible mode of operation, said step of providing a braking band 2 is performed by providing a braking band according to any one of the embodiments described above.

According to a possible mode of operation, said step of providing a braking band 11 is performed by providing a plurality of elastic elements according to any one of the embodiments described above.

According to a possible mode of operation, said step of inserting is performed by snapping each elastic element 11 onto at least one portion of at least one radial tooth 7 of the braking band 2.

According to a possible mode of operation, said step of inserting is performed by snapping each elastic element 11 onto at least one portion of at least two contiguous radial teeth 7 of the braking band 2.

According to a possible mode of operation, said step of associating is performed by providing a bell 6 according to any one of the embodiments described above.

According to a possible mode of operation, said step of associating is performed mutually approaching the bell 6 to the braking band 2 in axial direction A-A, and preferably in axial direction A-A from said wheel facing side 14 of the disc 1.

According to a possible mode of operation, said step of associating is performed by inserting said plurality of radial teeth 7 of the braking band 2 into said plurality of bell seats 10 of the bell 6 and at the same time by inserting said plurality of axial teeth 9 of the bell 6 into said plurality of band seats 8 of the braking band 2.

According to a possible mode of operation, said associating step is performed by interposing at least one portion of said plurality of elastic elements 11 between said second axial side 19 of said plurality of radial teeth 7 of the braking band 2 and said axial abutting surface 12 of the bell 6.

According to a possible mode of operation, said step of associating is performed by interposing at least one portion of said plurality of elastic elements 11 between at least one circumferential side 20 of said plurality of radial teeth 7 of the braking band 2 and an adjacent axial tooth 9 of the bell 6.

According to a possible mode of operation, said step of preloading is performed by elastically preloading each radial tooth 7 of the braking band 2 with respect to said bell 6 from both said vehicle facing side 13 and said wheel facing side 14 of the disc 1.

By virtue of the features described above, provided either separately or in combination, where applicable, it is possible to satisfy the sometimes-contrasting needs mentioned above, and to obtain the aforesaid advantages, in particular:
    a disc 1 which is compact in axial direction is provided;
    a large central seat of the bell 15 about the rotation axis of the disc A-A is provided delimited at least partially by the bell 6, so as to be able to house connecting devices to the wheel hub, such as rolling members and the like;
    a disc 1 for disc brake is provided in which impacts between the braking band and the bell in operating conditions are eliminated or at least minimized, thus preventing the onset of annoying rattling;
    said plurality of elastic elements are made to work about a chosen axial and/or circumferential elastic preload value;
    a disc is provided able to dissipate rapidly the heat accumulated during the braking action as well as during repeated braking;
    the relative sliding is allowed in radial direction between the braking band and the bell to dissipate the thermal stresses which occur during the braking action;
    a silent braking can be obtained in operating conditions.

Those skilled in the art may make many changes and adaptations to the embodiments described above or may replace elements with others which are functionally equivalent in order to meet contingent needs without however departing from the scope of the appended claims.

LIST OF REFERENCE NUMERALS

1—Disc for brake disc
2—Disc braking band
3—First braking surface
4—Second braking surface
5—Radially internal edge portion of the braking band
6—Disc bell
7—Radial tooth of the braking band
8—Band seat
9—Axial tooth of the bell
10—Bell seat
11—Elastic element
12—Bell axial abutting surface
13—Vehicle facing side of the disc
14—Wheel facing side of the disc
15—Central bell seat
16—Bell internal surface 17—Radially internal edge surface of the radial tooth of the braking band
18—First axial side of the radial tooth of the braking band
19—Second axial side of the radial tooth of the braking band
20—Circumferential side of the radial tooth of the braking band
21—Axial surface of the axial tooth of the bell
22—Fixing device of the elastic element
23—Front portion of the elastic element
24—Axial arm of the elastic element
25—Front connecting portion of the axial arm of the elastic element
26—Free end portion of the axial arm of the elastic element
27—Radial tooth corner of the braking band
28—Curved portion of the axial arm of the elastic element
29—Braking band plate
30—Braking band plate
31—Braking band gap
32—Connecting-spacing elements of the braking band
33—Access mouth to the ventilation channels of the braking band
A-A—Disc rotation axis and axial direction
R-R—Radial direction
RE—Radially external sense
RI—Radially internal sense
C-C—Circumferential direction

The invention claimed is:

1. A disc for a disc brake, suitable for rotating about a rotation axis (A-A) defining an axial direction (A-A) coincident with or parallel to the rotation axis of the disc, wherein a radial direction (R-R) is defined orthogonal to the axial direction (A-A) and incident thereto, and a circumferential direction (C-C), orthogonal to both the axial direction (A-A) and the radial direction (R-R); said disc comprising:
a braking band;
a bell, suitable to form a connection with a wheel hub of a vehicle associable with the disc;
a plurality of elastic elements, suitable to elastically bias said braking band with respect to said bell;
wherein:
said braking band comprises a first braking surface and a second braking surface, opposite to said first braking surface, wherein said first braking surface defines an axially internal side or vehicle facing side of the disc, and wherein said second braking surface defines an axially external side or wheel facing side of the disc, opposite to said vehicle facing side;
said braking band further comprises at least one radially internal edge portion, suitable to face the rotation axis (A-A) of the disc;
said bell comprises a body delimiting a central bell seat of substantially cylindrical shape and an internal bell surface of substantially cylindrical shape and facing said central bell seat;
wherein:
said braking band further comprises a plurality of radial teeth projecting from said at least one radially internal edge portion of the braking band towards the rotation axis (A-A) of the disc, delimiting a plurality of band seats;
each radial tooth of said plurality of radial teeth of the braking band comprises a radially internal edge surface facing the rotation axis (A-A) of the disc;
each radial tooth of said plurality of radial teeth of the braking band comprises a first axial tooth side facing towards said vehicle facing side of the disc and a second axial tooth side, opposite with respect to said first axial tooth side and facing towards said wheel facing side of the disc;
each radial tooth of said plurality of radial teeth of the braking band comprises at least one circumferential side facing in the circumferential direction (C-C);
wherein:
said bell further comprises a plurality of axial teeth projecting from the body of said bell towards said vehicle facing side of the disc delimiting at least partially a plurality of bell seats;
said bell further comprises a plurality of axial abutting surfaces delimiting in the axial direction (A-A) said plurality of bell seats;
and wherein:
said plurality of radial teeth is housed in said plurality of bell seats, so that said internal bell surface is substantially locally aligned with said radially internal edge surface of each radial tooth;
each elastic element of said plurality of elastic elements is removably connected to at least one axial tooth of said plurality of axial teeth of said bell;
each elastic element of said plurality of elastic elements embraces at least one portion of said first axial tooth side, of said second axial tooth side and of said at least one circumferential side of at least one radial tooth of the braking band, elastically preloading said at least one radial tooth with respect to said bell.

2. The disc of claim 1, wherein each elastic element is made as a single piece.

3. The disc of claim 1, wherein each circumferential side of each radial tooth is connected to said first axial tooth side and to said second axial tooth side forming a beveled or cut corner.

4. The disc of claim 1, wherein each elastic element comprises a front elastic element portion, suitable to be removably connected to a bell tooth front surface; and/or
wherein each elastic element comprises at least one axial arm, suitable to embrace at least one portion of said at least one circumferential side of said radial tooth of the braking band.

5. The disc of claim 4, wherein said at least one axial arm of the elastic element comprises a free end portion embracing at least one portion of said second axial tooth side of each radial tooth of the braking band; and/or wherein
said at least one axial arm of the elastic element comprises a front connecting portion embracing at least one portion of said first axial tooth side of each radial tooth of the braking band, connecting to said front elastic element portion.

6. The disc of claim 5, wherein said at least one axial arm comprises a leaf spring elastically biasing away from one another said at least one circumferential side of each radial tooth of the braking band and a facing adjacent axial tooth of the bell; and/or wherein
said front connecting portion of the elastic element elastically biases, in the axial direction (A-A), said radial tooth of the braking band towards an axial abutting surface of said plurality of abutting surfaces of said bell; and/or wherein
said free end portion of the at least one axial arm of the elastic element comprises a leaf spring interposed between said second axial tooth side of the radial tooth of the braking band and said axial abutting surface of the bell biasing away from one another said second axial tooth side of the radial tooth of the braking band and said axial abutting surface of the bell.

7. The disc of claim 1, wherein each elastic element comprises a couple of opposing axial arms, so as to interpose itself between each of the opposite sides of each axial tooth of the bell and two opposite adjacent radial teeth of the braking band.

8. The disc of claim 1, wherein each elastic element comprises two opposing axial arms each forming a front connecting portion and a free end portion, wherein the front connecting portions axially bias two radial teeth of the braking band adjacent to each axial tooth of the bell and opposite in the circumferential direction (C-C) with respect to said axial tooth, and wherein said free end portions axially bias said two radial teeth of the braking band adjacent to each axial tooth of the bell and opposite in the circumferential direction (C-C) with respect to said axial tooth.

9. The disc of claim 1, wherein said braking band comprises two plates facing one another in the axial direction (A-A) and spaced apart from one another by a predetermined axial distance forming a gap, wherein said braking band further comprises a plurality of connecting-spacing elements extending to connect the two facing plates to one another, delimiting ventilation channels suitable to convey a flow of cooling fluid; and/or wherein
- said radially internal edge portion of the braking band delimits mouths, open in the axial direction (A-A), for accessing the ventilation channels inside said gap; wherein
- at least some of said mouths for accessing the ventilation channels are open towards said vehicle facing side of the disc; and/or wherein
- at least some of said mouths for accessing the ventilation channels are open towards said wheel facing side of the disc.

10. A method for assembling a disc for a disc brake, the method comprising the following steps:
- providing a braking band having a plurality of radial teeth projecting from a radially internal edge portion of the braking band towards a rotation axis (A-A) of the disc, delimiting a plurality of band seats;
- providing a plurality of elastic elements;
- inserting each elastic element of said plurality of elastic elements into a band seat of the braking band;
- associating to said braking band a bell comprising a plurality of axial teeth projecting from a body of said bell towards a vehicle facing side of the disc at least partially delimiting a plurality of bell seats, so that an internal surface of the bell is locally aligned with a radially internal edge surface of each radial tooth of the braking band;
- connecting each elastic element to an axial tooth of the bell;
- elastically preloading said plurality of radial teeth of the braking band with respect to said bell in an axial direction (A-A) and in a circumferential direction (C-C).

11. The method of claim 10, wherein the inserting step is performed by inserting each elastic element of said plurality of elastic elements into a band seat of the braking band in the radial direction (R-R).

12. The method of claim 10, wherein the inserting step is performed by inserting each elastic element of said plurality of elastic elements into a band seat of the braking band in a radially external direction (RE).

13. The method of claim 10, wherein the inserting step is performed by snap fitting each elastic element of said plurality of elastic elements to at least one portion of at least one radial tooth of the braking band.

14. The method of claim 10, wherein the inserting step is performed by snap fitting each elastic element of said plurality of elastic elements to at least one portion of two adjacent radial teeth of the braking band.

15. The method of claim 10, wherein the associating step is performed by getting closer one another the bell and the braking band in the axial direction (A-A).

16. The method of claim 10, wherein the associating step is performed by getting closer one another the bell and the braking band in an axial direction (A-A) from a wheel facing side of the disc.

17. The method of claim 10, wherein the associating step is performed by inserting said plurality of radial teeth of the braking band into said plurality of bell seats of the bell and at the same time by inserting said plurality of axial teeth of the bell into said plurality of band seats of the braking band.

18. The method of claim 10, wherein the associating step is performed by interposing at least one portion of said plurality of elastic elements between a second axial tooth side of said plurality of radial teeth of the braking band and an axial abutting surface of the bell.

19. The method of claim 10, wherein the associating step is performed by interposing at least one portion of said plurality of elastic elements between at least one circumferential side of said plurality of radial teeth of the braking band and an adjacent axial tooth of the bell facing the at least one circumferential side.

20. The method of claim 10, wherein the preloading step is performed by elastically preloading each radial tooth of the braking band with respect to said bell from both said vehicle facing side and said wheel facing side of the disc.

* * * * *